UNITED STATES PATENT OFFICE.

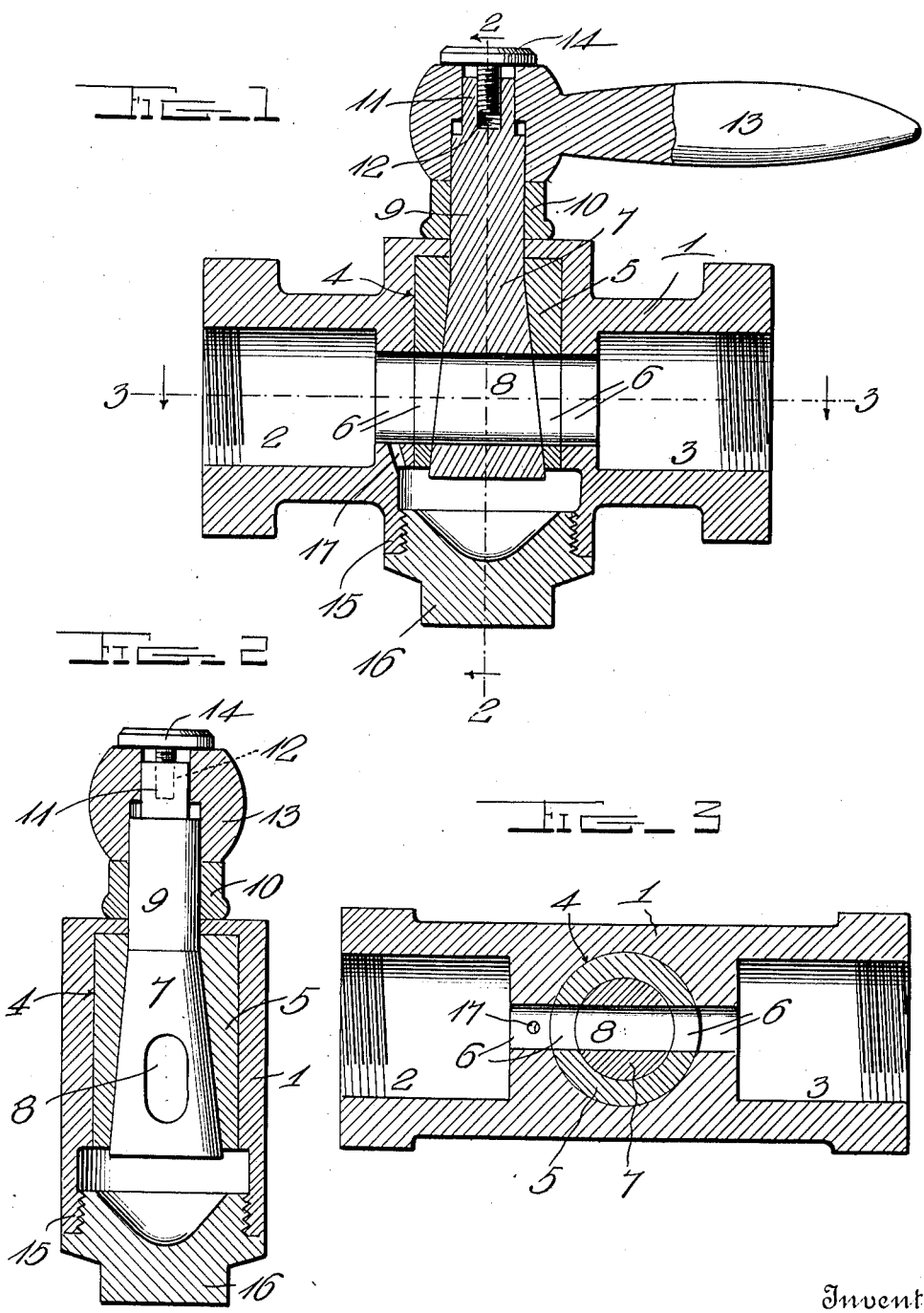

CHARLES WRIGHT, OF YOUNGWOOD, PENNSYLVANIA.

VALVE.

1,035,401.           Specification of Letters Patent.     Patented Aug. 13, 1912.

Application filed December 1, 1910. Serial No. 595,092.

*To all whom it may concern:*

Be it known that I, CHARLES WRIGHT, a citizen of the United States, residing at Youngwood, in the county of Westmoreland and State of Pennsylvania, have invented certain new and useful Improvements in Valves; and I do declare the following to be a full, clear, and exact description of the invention, such as will enable others skilled in the art to which it appertains to make and use the same.

This invention relates to improvements in valves.

One object of the invention is to provide an improved construction of valve having a fiber lined seat in which the valve is adapted to be adjusted to compensate for the wear of the lining thereby always maintaining a fluid tight engagement with said seat or the lining therein.

Another object is to provide a valve having means whereby the pressure of the fluid on the inlet side of the valve is applied thereto to hold the same in tight engagement with its seat so that the greater or higher the pressure of the fluid the tighter the valve will be held in place.

With these and other objects in view the invention consists of certain novel features of construction, combination and arrangement of parts as will be more fully described and particularly pointed out in the appended claim.

In the accompanying drawings: Figure 1 is a vertical longitudinal sectional view of a valve constructed in accordance with my invention; Fig. 2 is a vertical transverse sectional view; and, Fig. 3 is a horizontal sectional view of the same.

In the present embodiment of the invention I have shown the same arranged in the form of a cut off valve comprising a casing 1 having on its opposite ends threaded sockets 2 and 3 to which are adapted to be connected the fluid conducting pipes in which the valve is arranged. In the center of the casing 1 is formed a tubular valve seat 4 in which is arranged a lining 5 formed of fiber or similar material said lining being preferably formed of a composition of fiber and asbestos. In the fiber lining 5 and the adjacent side walls of the valve seat at the ends of the sockets 2 and 3 are formed alined fluid passages 6 through which the fluid passes when the valve is turned to an open position.

Adapted to be engaged with the lining 5 is a tapered valve 7 having formed therethrough a transverse slot 8 which when the valve is turned in open position is adapted to connect with the passages in the opposite sides of the lining and in the ends of the sockets 2 and 3 thus permitting the fluid to pass through the valve. The valve 7 is provided with an upwardly projecting cylindrical stem 9 which projects through the upper side of the casing and has arranged thereon a washer 10 as shown. The upper end of the stem is provided with a reduced squared extension 11 having formed therein a threaded socket 12. With the squared extension and the upper end of the stem is adapted to be engaged a handle 13 having in one end a stem engaging passage the lower portion of which is cylindrical to receive the projecting cylindrical portion of the stem while the upper portion of said passage is squared to receive the squared extension 11 on the stem thereby permitting the stem and valve to be turned by the handle.

Adapted to be screwed into engagement with the threaded socket in the upper end of the extension 11 is a valve adjusting and handle fastening screw 14 which when screwed down into the socket 11 and into engagement with the upper side of the handle will draw the valve upwardly into tight engagement with the seat, said screw thus providing for the adjustment of the valve whereby the latter may be maintained in fluid tight engagement with the lining of the seat.

On the lower side of the valve casing 1 below the valve seat is formed an annular extension 15 which is threaded interiorly to receive a cap nut 16 which is screwed therein and provides a closure for the space formed by said extension. The lower end of the valve 7 is disposed above the space formed by the extension 15 and said space is connected by a by-pass 17 with the socket 3 on the high pressure or inlet end of the valve casing so that a portion of the fluid from the pipe connected with said socket will enter said space below the valve thus causing the pressure of the fluid on this side or the inlet side or end of the valve to be exerted on the lower end of the valve thereby holding the latter in tight engagement with the lining of this side. It is to be observed by referring to Fig. 1 that the chamber formed by the extension and removable closure plug 16, is of sufficient size to conveniently permit the fiber lining 5, and valve 7 to be properly positioned, and as clearly shown the inclined by-pass 17 is located in the upper wall of the chamber adjacent to the lining whereby the fluid is properly directed to the chamber. By thus constructing the valve casing it will be seen that the greater or higher the pressure on the inlet side of the valve the more tightly the latter will be held in engagement with its seat.

While the valve is here shown as arranged in the form of a cut off valve to be arranged in a fluid conducting pipe it is obvious that the valve may be arranged in the form of a stop cock, globe or any other form of valve.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

A valve comprising a casing having oppositely disposed fluid inlet and outlet sockets, the former being provided with a by-pass, a valve seat formed in the casing between the sockets, a fiber lining snugly confined in said seat, a tapered valve adapted to frictionally engage with a correspondingly shaped bore in the lining, the lower closed end of which extends below the lining, a closure plug for the lower end of the casing and spaced from the lower end of the valve whereby a fluid chamber is located below the lower ends of the valve and lining, said chamber being in communication with the inlet socket by the by-pass, the latter being formed in the upper wall of the chamber adjacent the lining whereby the pressure of the fluid will be exerted upon the lower closed end of the valve, and means for adjusting said valve in respect to the lining thus confined within the casing.

In testimony whereof I have hereunto set my hand in presence of two subscribing witnesses.

CHARLES WRIGHT.

Witnesses:
 H. H. BYERS,
 S. M. KEEFER.